(12) United States Patent
Kagami

(10) Patent No.: US 11,108,067 B2
(45) Date of Patent: Aug. 31, 2021

(54) FUEL CELL SYSTEM AND METHOD FOR CONTROLLING SAME

(71) Applicant: NISSAN MOTOR CO., LTD., Yokohama (JP)

(72) Inventor: Fumio Kagami, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/629,649

(22) PCT Filed: Jul. 28, 2017

(86) PCT No.: PCT/JP2017/027549
§ 371 (c)(1),
(2) Date: Jan. 9, 2020

(87) PCT Pub. No.: WO2019/021482
PCT Pub. Date: Jan. 31, 2019

(65) Prior Publication Data
US 2020/0381754 A1 Dec. 3, 2020

(51) Int. Cl.
*H01M 8/04746* (2016.01)
*H01M 8/0612* (2016.01)
(Continued)

(52) U.S. Cl.
CPC ... *H01M 8/04776* (2013.01); *H01M 8/04007* (2013.01); *H01M 8/0444* (2013.01);
(Continued)

(58) Field of Classification Search
None
See application file for complete search history.

(56) References Cited

U.S. PATENT DOCUMENTS

2003/0072982 A1* 4/2003 Takeuchi ............... C01B 3/323
429/424
2013/0130138 A1* 5/2013 Ukai ..................... C01B 3/48
429/423
(Continued)

FOREIGN PATENT DOCUMENTS

EP        3 392 947 A1    10/2018
JP        2001-332284 A1   11/2001
(Continued)

*Primary Examiner* — Christopher P Domone
(74) *Attorney, Agent, or Firm* — Foley & Lardner LLP

(57) ABSTRACT

A fuel cell system that supplies fuel gas and oxidant gas to a fuel cell stack and causes the fuel cell stack to generate power includes a tank that stores aqueous solution containing oxygen-containing fuel, and a reformer that reforms mixed gas obtained as the aqueous solution is vaporized, and generates the fuel gas. The fuel cell system also includes an actuator that supplies the mixed gas to the reformer, a heating device that heats the reformer, a detecting unit that estimates or detects a concentration of the oxygen-containing fuel in the mixed gas that is supplied to the reformer, and a controller programmed to control operations of the actuator and the heating device so that the fuel cell generates power. The controller is programmed to increase a thermal dose to the reformer from the heating device or reduces a supply amount of the mixed gas to the reformer by the actuator when the concentration of the oxygen-containing fuel is high, compared to when the concentration is low.

8 Claims, 12 Drawing Sheets

(51) Int. Cl.
- *H01M 8/04007* (2016.01)
- *H01M 8/0444* (2016.01)
- *H01M 8/04701* (2016.01)
- *H01M 8/04082* (2016.01)

(52) U.S. Cl.
CPC ... *H01M 8/04201* (2013.01); *H01M 8/04738* (2013.01); *H01M 8/0618* (2013.01)

(56) References Cited

U.S. PATENT DOCUMENTS

| | | |
|---|---|---|
| 2014/0051000 A1 | 2/2014 | Ogawa et al. |
| 2015/0333347 A1* | 11/2015 | Brunaux ........... H01M 8/04776 429/446 |
| 2018/0277865 A1 | 9/2018 | Yaguchi |

FOREIGN PATENT DOCUMENTS

| | | |
|---|---|---|
| JP | 2002-241104 A | 8/2002 |
| JP | 2002-316801 A | 10/2002 |
| JP | 5763405 B2 | 8/2015 |
| WO | WO-2017/104211 A1 | 6/2017 |

* cited by examiner

US 11,108,067 B2

FUEL CELL SYSTEM AND METHOD FOR CONTROLLING SAME

TECHNICAL FIELD

The present invention relates to a fuel cell system and a method for controlling same. In the fuel cell system, fuel gas generated by a reformer is supplied to a fuel cell.

BACKGROUND ART

The publication of Japanese Patent No. 5763405 discloses a fuel cell system in which hydrocarbon gas and steam are mixed in order to generate fuel gas to be supplied to a fuel cell, and the mixed gas generated as a result of the mixing is reformed.

SUMMARY OF INVENTION

In the fuel cell system described above, it is necessary to provide two tanks that are a water storage tank that generates steam, and a fuel tank that stores oxygen-containing fuel such as hydrocarbon gas. Because of this, there is a problem that a configuration of the fuel cell system becomes complex.

The invention has been accomplished in order to address such a problem, and an object of the invention is to provide a fuel cell system that generates fuel gas with a simple configuration, and a method for controlling the fuel cell system.

According to an aspect of the present invention, a fuel cell system that supplies fuel gas and oxidant gas to a fuel cell stack and causes the fuel cell stack to generate power includes a tank that stores aqueous solution containing oxygen-containing fuel, and a reformer that reforms mixed gas obtained as the aqueous solution is vaporized, and generates the fuel gas. The fuel cell system also includes an actuator that supplies the mixed gas to the reformer, a heating device that heats the reformer, a detecting unit that estimates or detects a concentration of the oxygen-containing fuel in the mixed gas that is supplied to the reformer, and a controller programmed to control operations of the actuator and the heating device so that the fuel cell generates power. The controller is programmed to increase a thermal dose to the reformer from the heating device or reduces a supply amount of the mixed gas to the reformer by the actuator when the concentration of the oxygen-containing fuel is high, compared to when the concentration is low.

DESCRIPTION OF EMBODIMENTS

Hereinafter, embodiments of the invention are described with reference to the attached drawings.

First Embodiment

Figure 1:
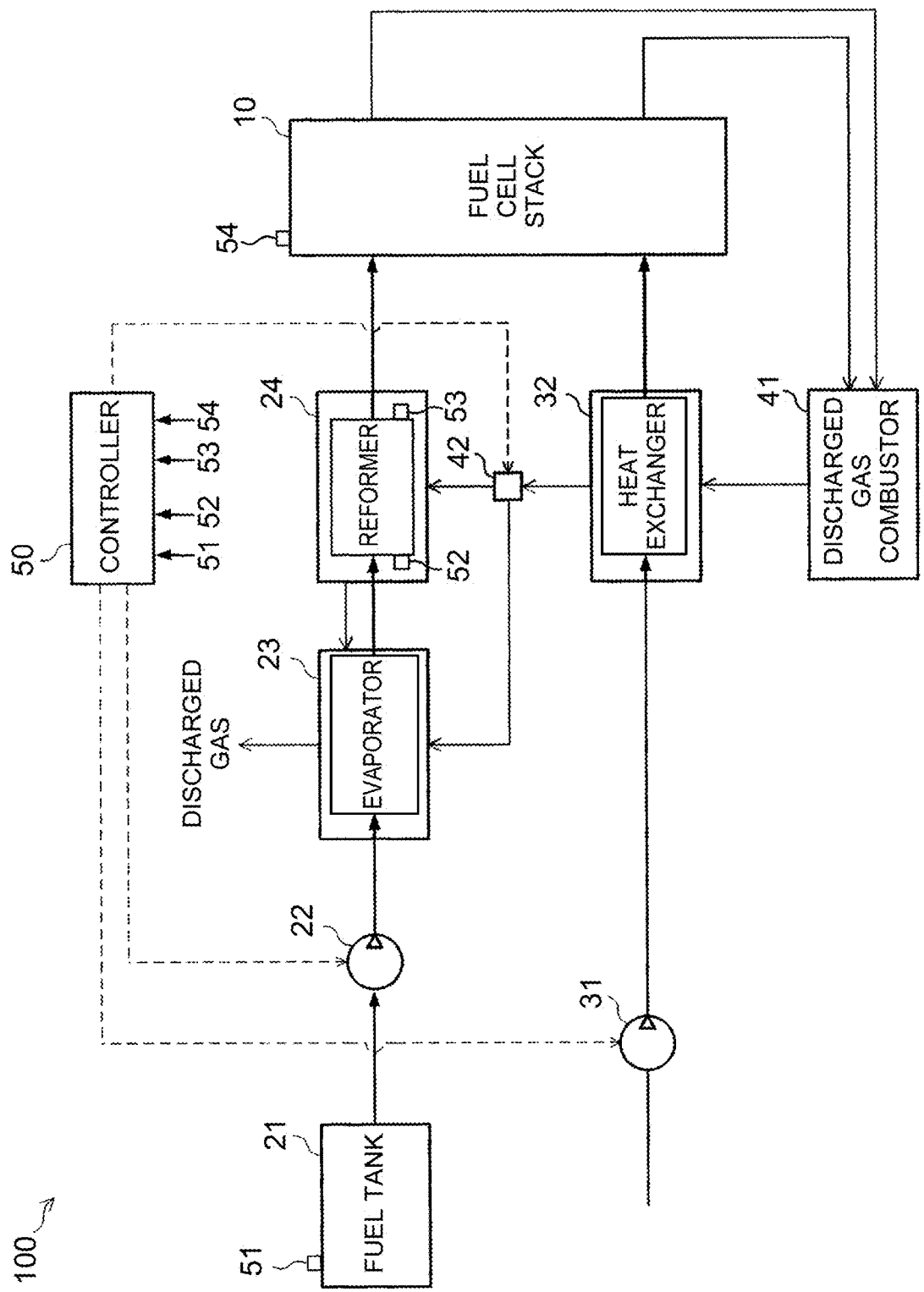
FIG. 1 is a view showing an example of a configuration of a fuel cell system according to a first embodiment of the invention.

FIG. 1 is a configuration view showing an example of a configuration of a fuel cell system 100 according to a first embodiment of the invention.

The fuel cell system 100 supplies fuel gas and oxidant gas to a fuel cell so that the fuel cell generates power. The fuel cell system 100 is installed in a moving body such as a vehicle, an air plane, or a ship. The fuel cell system 100 according to this embodiment is installed in a vehicle such as an electric vehicle including a hybrid vehicle, or a train.

The fuel cell system 100 includes a fuel cell stack 10, a fuel tank 21, a fuel pump 22, an evaporator 23, a reformer 24, an oxidant supply apparatus 31, a heat exchanger 32, a discharged gas combustor 41, a discharged gas control valve 42, and a controller 50.

The fuel cell stack 10 is configured by a fuel cell that receives supplies of fuel gas and oxidant gas and generates power. The fuel cell stack 10 is realized by a solid oxide type fuel cell, a polymer electrolyte fuel cell, or the like. The fuel cell stack 10 in this embodiment is a laminated cell in which a plurality of fuel cells, each being a single cell, is laminated. The fuel cell stack 10 is configured by a solid oxide type fuel cell.

The fuel cell stack 10 is provided with an FC output sensor 54. The FC output sensor 54 detects an output of the fuel cell stack 10. For example, the FC output sensor 54 detects an electric signal of at least either voltage or current output from the fuel cell stack 10.

The FC output sensor 54 according to this embodiment detects a voltage value and a current value of the fuel cell stack 10, and outputs a power value to the controller 50 as an output of the fuel cell stack 10. The power value is obtained by multiplying the detected current value by the voltage value.

The fuel tank 21 stores aqueous solution that contains oxygen-containing fuel and water and is necessary to generate fuel gas. The oxygen-containing fuel is a fuel that contains an oxygenated compound such as alcohol or methyl tert-butyl ether (MTBE). The fuel tank 21 according to this embodiment stores ethanol aqueous solution. For example, aqueous solution with 45% vol of ethanol is supplied to the fuel tank 21.

The fuel tank 21 is provided with a fuel concentration sensor 51. The fuel concentration sensor 51 is a detecting unit configured to detect a concentration of the oxygen-containing fuel in the aqueous solution stored in the fuel tank 21. The fuel concentration sensor 51 outputs a detected value to the controller 50.

The fuel pump 22 is an actuator that sucks up the aqueous solution stored in the fuel tank 21 and supplies the aqueous solution to the evaporator 23. The fuel pump 22 also supplies the fuel gas to the fuel cell stack 10 through the evaporator 23 and the reformer 24. This means that the fuel pump 22 has a function of supplying gas discharged from the evaporator 23 to the reformer 24.

The evaporator 23 vaporizes the aqueous solution supplied from the fuel pump 22 so as to generate mixed gas in which the oxygen-contained fuel gas is contained in steam. The evaporator 23 is heated by discharged gas from the discharged gas combustor 41. Discharged gas that flows into the evaporator 23 is discharged outside the fuel cell system 100.

Heat is supplied to the evaporator 23 according to this embodiment by at least either discharged gas that has passed through the reformer 24 through the discharged gas control valve 42 or discharged gas that is directly supplied to the evaporator 23 from the discharged gas control valve 42. The mixed gas of the oxygen-contained fuel gas and steam obtained as a result of vaporization by the evaporator 23 is supplied to the reformer 24.

The reformer 24 has a reforming catalyst and generates fuel gas to be supplied to the fuel cell stack 10 by reforming the mixed gas supplied from the evaporator 23. In the reformer 24, the oxygen-contained fuel gas and steam that are contained in the mixed gas have a catalyzed reaction, and the fuel gas is thus generated.

This means that, in the reformer 24, steam reforming is performed by which the oxygen-contained fuel gas is reformed with use of steam. The reformer 24 according to this embodiment performs the steam reforming of ethanol as the oxygen-containing fuel, and then generates hydrogen gas as the fuel gas for the fuel cell stack 10.

The reformer 24 is provided with an entry temperature sensor 52 and an exit temperature sensor 53 that configure a detecting unit. The entry temperature sensor 52 detects supply temperature of the mixed gas supplied to the reformer 24, and outputs a detected value to the controller 50. The exit temperature sensor 53 detects discharge temperature of the fuel gas discharged from the reformer 24, and outputs a detected value to the controller 50. The entry temperature sensor 52 and the exit temperature sensor 53 may also be configured integrally with each other.

The oxidant supply apparatus 31 supplies oxidant gas to the fuel cell stack 10. The oxidant supply apparatus 31 is realized by, for example, a compressor or a pump. The oxidant supply apparatus 31 according to this embodiment sucks up air as the oxidant gas and supplies it to the fuel cell stack 10.

The heat exchanger 32 heats air supplied to the fuel cell stack 10 from the oxidant supply apparatus 31 in order to increase or maintain temperature of the fuel cell stack 10. The heat exchanger 32 outputs heated air to the fuel cell stack 10. The heat exchanger 32 exchanges heat between discharged gas from the discharged gas combustor 41 and air from the oxidant supply apparatus 31. Thus, heat of the discharged gas is supplied to the air, and temperature of air supplied to the fuel cell stack 10 increases.

The discharged gas combustor 41 burns the fuel gas and the oxidant gas discharged from the fuel cell stack 10. The discharged gas combustor 41 according to this embodiment burns the hydrogen gas and air discharged from the fuel cell stack 10. High-temperature discharged gas generated due to the burning of the hydrogen gas and air is supplied to the heat exchanger 32.

The discharged gas control valve 42 supplies heat of the discharged gas from the discharged gas combustor 41 to the reformer 24 through the heat exchanger 32. This means that the discharged gas combustor 41 and the discharged gas control valve 42 configure a heating device that heats the reformer 24. The discharged gas control valve 42 controls a flow rate of the discharged gas discharged from the heat exchanger 32 to the reformer 24.

The discharged gas control valve 42 according to this embodiment supplies a part of the discharged gas to the reformer 24, the discharged gas being supplied to the evaporator 23 from the heat exchanger 32. The larger an opening degree of the discharged gas control valve 42 becomes, the more the flow rate of the discharged gas supplied to the reformer 24 from the heat exchanger 32 is increased.

The controller 50 is a control unit that controls an operation of the fuel cell system 100. The controller 50 includes one or more microcomputers each of which includes a central processing unit (CPU) and a storage unit. In the central processing unit, predetermined processing is programmed.

Once the fuel cell system 100 is started, the controller 50 controls operations of the fuel pump 22 and the oxidant supply apparatus 31 so that supply flow rates of the fuel gas and the oxidant gas to the fuel cell stack 10 reach target values, respectively.

The target values for the fuel gas and the oxidant gas are set based on a power generation-required flow rate that indicates a flow rate required for power generation in the fuel cell stack 10. For example, the power generation-required flow rate is set in advance with reference to a rated output of the fuel cell stack 10. For example, in the fuel cell system in which the rated output of the fuel cell stack 10 becomes larger as temperature of the fuel cell stack 10 becomes higher, the controller 50 may correct a set value so that the power generation-required flow rate is increased as temperature of the fuel cell stack 10 becomes higher.

Alternatively, the power generation-required flow rate may be calculated based on a detection value of an accelerator sensor that detects a stepping amount of an acceleration pedal (not shown). In such a case, a value set as the power generation-required flow rate is larger as the stepping amount of the acceleration pedal increases. Alternatively, in power supply system in which the fuel cell system 100 is used together with a battery, the controller 50 may set the power generation-required flow rate to a larger value when a charge level of the battery, for example, a state of charge (SOC) becomes smaller.

In this embodiment, ethanol serving as the oxygen-containing fuel has higher volatility than that of water. Therefore, after the aqueous solution is supplied to the fuel tank 21, the concentration of ethanol contained in the aqueous solution is gradually reduced as time elapses. Due to the change in the ethanol concentration with time, a supply amount of ethanol in the mixed gas that is supplied to the reformer 24 is reduced. Accordingly, an amount of hydrogen gas generated in the reformer 24 is reduced. As a result, a flow rate of the hydrogen gas supplied to the fuel cell stack 10 becomes insufficient.

As a measure against the above issue, aqueous solution with a high ethanol concentration may be prepared and supplied to the fuel tank 21 in consideration of the change in the ethanol concentration in the aqueous solution with time. However, with this kind of measure, a gas composition in the reformer 24 changes due to an increase in the ethanol concentration.

Figure 2:
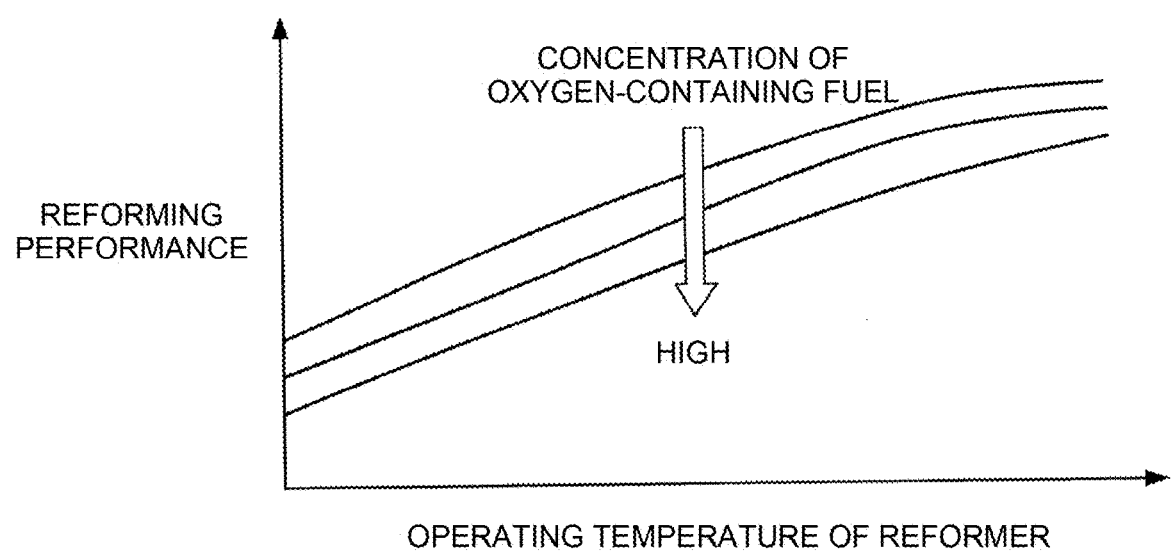
FIG. 2 is a conceptual view showings an example of a relation between operating temperature and reforming performance of a reformer for each concentration of oxygen-containing fuel in gas flowing in the reformer.

FIG. 2 is a conceptual view showing a relation between temperature characteristics that show reforming performance of the reformer 24 with respect to temperature, and the concentration of the oxygen-containing fuel in gas flowing into the reformer 24.

In FIG. 2, the horizontal axis represents operating temperature of the reformer 24, and the vertical axis represents reforming performance of the reformer 24. The higher the reforming performance of the reformer 24 becomes, the larger a ratio of an amount of fuel gas generated in the reformer 24 becomes with respect to an amount of gas supplied to the reformer 24.

As shown in FIG. 2, the higher the concentration of the oxygen-containing fuel becomes in the mixed gas flowing into the reformer 24, in other words, the smaller an amount of steam in the mixed gas becomes, the further the reforming performance of the reformer 24 is degraded When the reforming performance of the reformer 24 is degraded, the amount of the fuel gas generated in the reformer 24 is reduced, and a supply flow rate of hydrogen gas to the fuel cell stack 10 from the reformer 24 becomes insufficient.

Therefore, even if aqueous solution with a higher concentration of the oxygen-containing fuel was supplied to the fuel tank 21 in consideration of a reduction of the concentration of the oxygen-containing fuel with time, the concentration of the oxygen-containing fuel would become unnecessarily high in the reformer 24 immediately after the supply of the aqueous solution, and a supply flow rate of the fuel gas to the fuel cell stack 10 from the reformer 24 would be insufficient.

As a measure against this issue, the controller 50 according to this embodiment acquires a concentration parameter in order to specify the concentration of the oxygen-containing fuel in the mixed gas that flows into the reformer 24, and then changes an operating state of the reformer 24 in accordance with the magnitude of the concentration parameter.

The controller 50 according to this embodiment configures a detecting unit that estimates the concentration of the oxygen-containing fuel in the mixed gas that is supplied to the reformer 24. The controller 50 acquires a detection value of the fuel concentration sensor 51, detection values of the entry temperature sensor 52 and the exit temperature sensor 53, or a detection value of the FC output sensor 54, as the concentration parameter. Then, the controller 50 changes an operation amount of at least either one of auxiliary machines that are the fuel pump 22 and the discharged gas control valve 42, in accordance with the magnitude of the acquired detection value.

Figure 3:
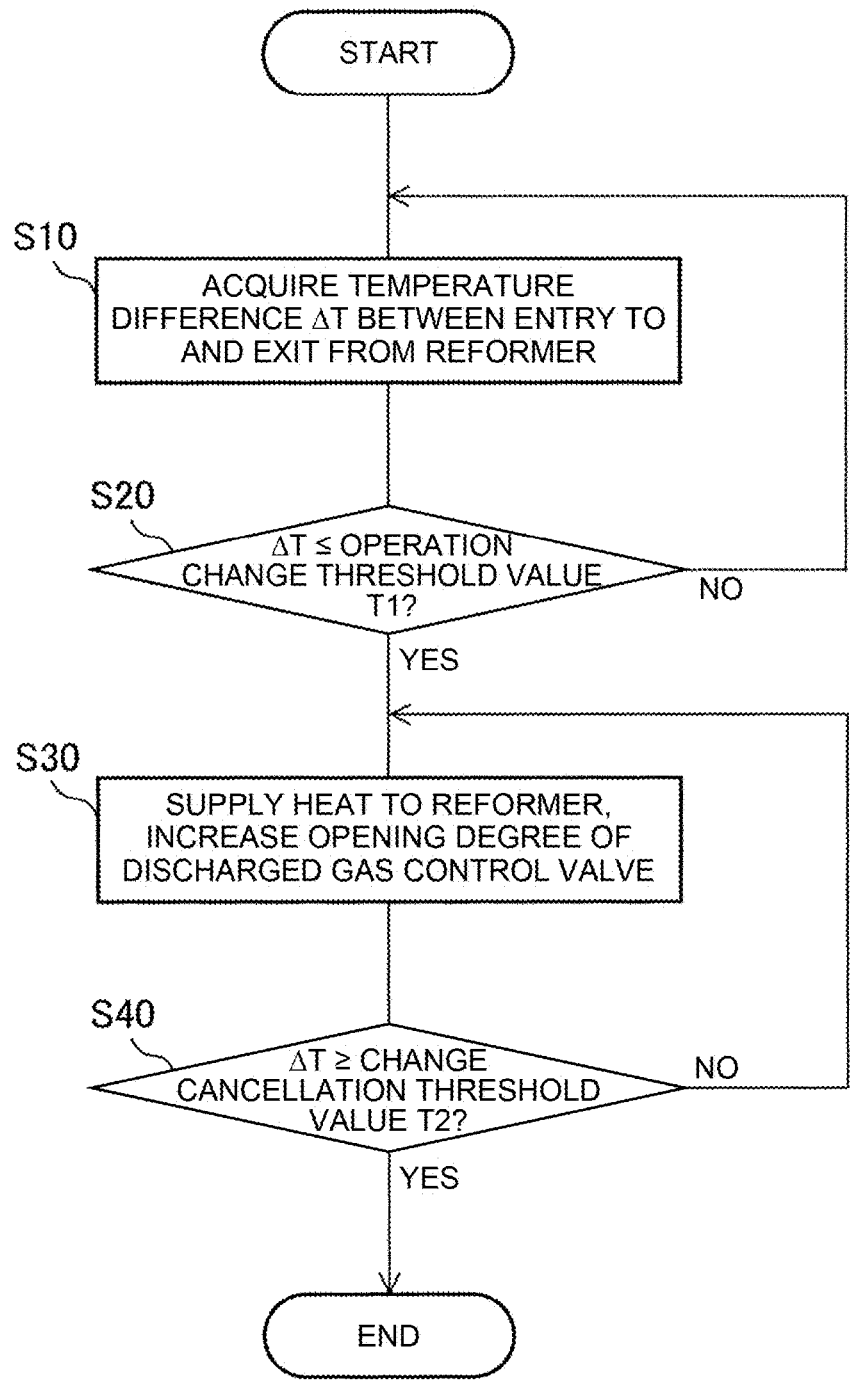
FIG. 3 is a flowchart showing an example of an operation control method by which the operating temperature of the reformer is controlled according to the embodiment.

FIG. 3 is a flowchart showing an example of processing steps regarding an operation control method by which the operating state of the reformer 24 is controlled.

In step S10, the controller 50 is programmed to acquire a temperature difference $\Delta T$ between an entry to and an exit from the reformer 24. The temperature difference $\Delta T$ is correlated with a concentration of the oxygen-containing fuel contained in the mixed gas that flows into the reformer 24. The controller 50 acquires a temperature difference that is obtained by deducting the detection value of the exit temperature sensor 53 from the detection value of the entry temperature sensor 52 as the temperature difference $\Delta T$ between the entry to and the exit from the reformer 24.

As shown in FIG. 2, for example, the higher the concentration of the oxygen-containing fuel in the mixed gas becomes, the more the oxygen-containing fuel is supplied excessively to the reformer 24, and a supply amount of steam becomes insufficient. Therefore, an endothermic reaction in the reformer 24 is inhibited, thereby degrading the reforming performance. As a result, the temperature difference $\Delta T$ between the entry to and the exit from the reformer 24 becomes small. The relation between the concentration of the oxygen-containing fuel in the mixed gas in the reformer 24, and the temperature difference $\Delta T$ between the entry to and the exit from the reformer 24 is described later with reference to FIG. 4.

In step S20, the controller 50 is programmed to determine whether or not the temperature difference $\Delta T$ between the entry to and the exit from the reformer 24 is equal to or less than an operation change threshold value T1 of the reformer 24. When the temperature difference $\Delta T$ exceeds the operation change threshold value T1, the controller 50 determines that the concentration of the oxygen-containing fuel in the mixed gas in the reformer 24 is close to an optimal value, in other words, the concentration of the oxygen-containing fuel is not high. Then, the controller 50 returns to the processing of step S10.

The foregoing operation change threshold value T1 is a threshold value for changing the operating state of the reformer 24. The operation change threshold value T1 is set to a temperature difference between the entry to and the exit from the reformer 24 such that a supply flow rate of the fuel gas to the fuel cell stack 10 from the reformer 24 does not fall below a lower limit value of a required fuel gas flow rate necessary for power generation in the fuel cell stack 10.

This means that the operation change threshold value T1 is set so that a ratio of an amount of the fuel gas generated with respect to a supply amount of the mixed gas to the reformer 24 is maintained at a certain value or larger. For example, the operation change threshold value T1 is set in advance based on experimental data and simulation results. In this embodiment, the operation change threshold value T1 is set to about 200° C.

In step S30, when the temperature difference $\Delta T$ between the entry to and the exit from the reformer 24 is equal to or less than the operation change threshold value T1, the controller 50 is programmed to determine that the concentration of the oxygen-containing fuel in the mixed gas that flows into the reformer 24 is high, and executes heating control for the reformer 24.

Specifically, the controller 50 increases an opening degree of the discharged gas control valve 42 by a predetermined step width so as to increase a discharged gas supply amount to the reformer 24. Accordingly, the discharged gas control valve 42 is opened, and an amount of heat of the discharged gas supplied to the reformer 24 increases, and therefore the operating temperature of the reformer 24 rises.

In step S40, after predetermined time has elapsed, the controller 50 is programmed to newly acquire the temperature difference ΔT between the entry to and the exit from the reformer 24, and determines whether or not the temperature difference ΔT is equal to or higher than a change cancellation threshold value T2 of the reformer 24.

The foregoing change cancellation threshold value T2 is a threshold value for returning the operating state of the reformer 24 to the state before the change. The change cancellation threshold value T2 is set to a temperature difference between the entry to and the exit from the reformer 24 with which the reforming performance of the reformer 24 is maintained sufficiently. The change cancellation threshold value T2 may be the same as or smaller than the operation change threshold value T1.

When the temperature difference ΔT between the entry to and the exit from the reformer 24 is less than the change cancellation threshold value T2, the controller 50 returns to the processing of the step S30, and further increases the opening degree of the discharged gas control valve 42 by the predetermined step width.

Meanwhile, when the temperature difference ΔT between the entry to and the exit from the reformer 24 exceeds the change cancellation threshold value T2, the controller 50 determines that the gas composition in the reformer 24 has improved, stops the heating control for the reformer 24, and ends the series of processing steps related to the operation control method for the reformer 24.

Figure 4:
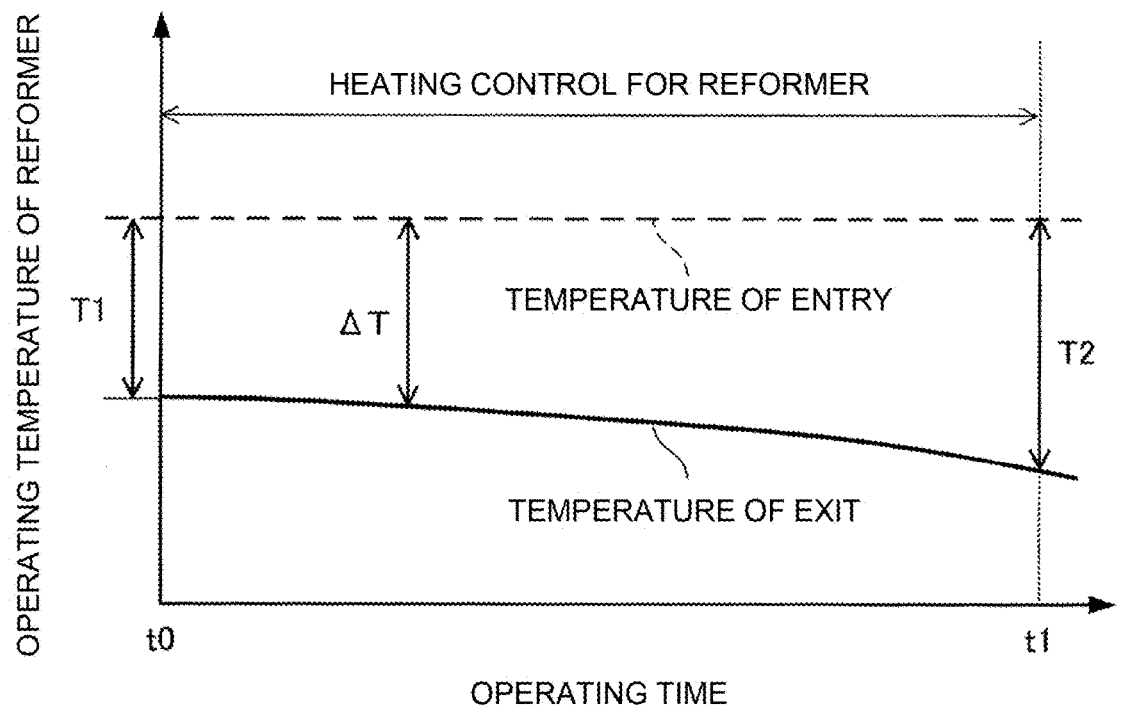
FIG. 4 is a time chart showing an example of an operation control method by which the operating temperature of the reformer is changed in accordance with a temperature difference between an entry to and an exit from the reformer.

FIG. 4 is a timing chart showing an example of the heating control by which the opening degree of the discharged gas control valve 42 is controlled and the reformer 24 is heated.

In FIG. 4, the broken line represents entry temperature of the reformer 24, and the solid line represents exit temperature of the reformer 24. Here, the vertical axis shows operating temperature of the reformer 24, and the horizontal axis shows operating time of the reformer 24.

At time t0, the concentration of the oxygen-containing fuel in the mixed gas that flows into the reformer 24 becomes high, and the endothermic reaction in the reformer 24 progresses, and the exit temperature of the reformer 24 decreases. As a result, the temperature difference ΔT between the entry to and the exit from the reformer 24 increases to the operation change threshold value T1. Hereinafter, a reason why the temperature difference ΔT between the entry to and the exit from the reformer 24 increases along with an increase in the concentration of the oxygen-containing fuel in the mixed gas is described briefly.

In the reformer 24 in this embodiment, the following typical chemical reaction happens in order to reform the mixed gas of ethanol ($C_2H_5OH$) and steam ($H_2O$) and generate hydrogen gas ($H_2$).

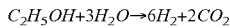

The foregoing chemical formula can be specifically expressed by a plurality of chemical formulas below.

 (1)

 (2)

 (3)

 (4)

 (5)

 (6)

The foregoing chemical reactions (2) and (4) are exothermic reactions, while the chemical reactions (1), (3), (5), and (6) are endothermic reactions. As described above, in the reformer 24, there are more endothermic reactions than exothermic reactions, and the endothermic reaction is dominant as a whole.

For example, when an ethanol concentration of the mixed gas that flows into the reformer 24 becomes higher than an optimal value, degrees of progresses of the chemical reactions (1) and (6) change, and an amount of hydrogen gas generated is reduced. This means that a gas composition in the reformer 24 is deteriorated. To be more specific, as the ethanol concentration becomes higher, steam ($H_2O$) tends to be insufficient. Thus, the degrees of progresses of the chemical reactions (3), (4), and (6) relating to steam are degraded.

As shown in FIG. 4, when the ethanol concentration in the mixed gas becomes higher than the optimal value, the progress of the endothermic reaction is inhibited, and the exit temperature of the reformer 24 increases. This means that, the higher the concentration of the oxygen-containing fuel in the mixed gas becomes, the less likely it becomes that the exit temperature of the reformer 24 is decreased. Therefore, the temperature difference ΔT between the entry to and the exit from the reformer 24 becomes small. Thus, the temperature difference ΔT between the entry to and the exit from the reformer 24 is correlated with the ethanol concentration in the mixed gas.

At time t0, since the concentration of the oxygen-containing fuel in the mixed gas flowing into the reformer 24 is high, the gas composition in the reformer 24 is deteriorated, and the temperature difference ΔT between the entry to and the exit from the reformer 24 is reduced to the operation change threshold value T1. As a measure against this issue, the controller 50 executes the heating control for the reformer 24 in order to change the operating state of the reformer 24.

To be more specific, the controller 50 increases the opening degree of the discharged gas control valve 42 to a predetermined value so that a supply amount of the discharged gas to the reformer 24 increases. Because of this, an amount of heat of the discharged gas supplied to the reformer 24 is increased, and the endothermic reaction in the reformer 24 progresses more easily, and the exit temperature of the reformer 24 decreases. Thus, the gas composition in the reformer 24 is improved gradually.

At time t1, the temperature difference ΔT between the entry to and the exit from the reformer 24 becomes larger than the change cancellation threshold value T2. Accordingly, the controller 50 stops the heating control for the reformer 24 in order to return the operating state of the reformer 24 to the operating state before the change.

To be more specific, the controller 50 sets the opening degree of the discharged gas control valve 42 to the value before the change or a specific value so that the temperature difference ΔT between the entry to and the exit from the reformer 24 is maintained. Because of this, it is possible to restrain a decrease in a generation amount of the fuel gas due to a decrease in the concentration of the oxygen-containing fuel in the mixed gas that flows into the reformer 24.

Figure 5:
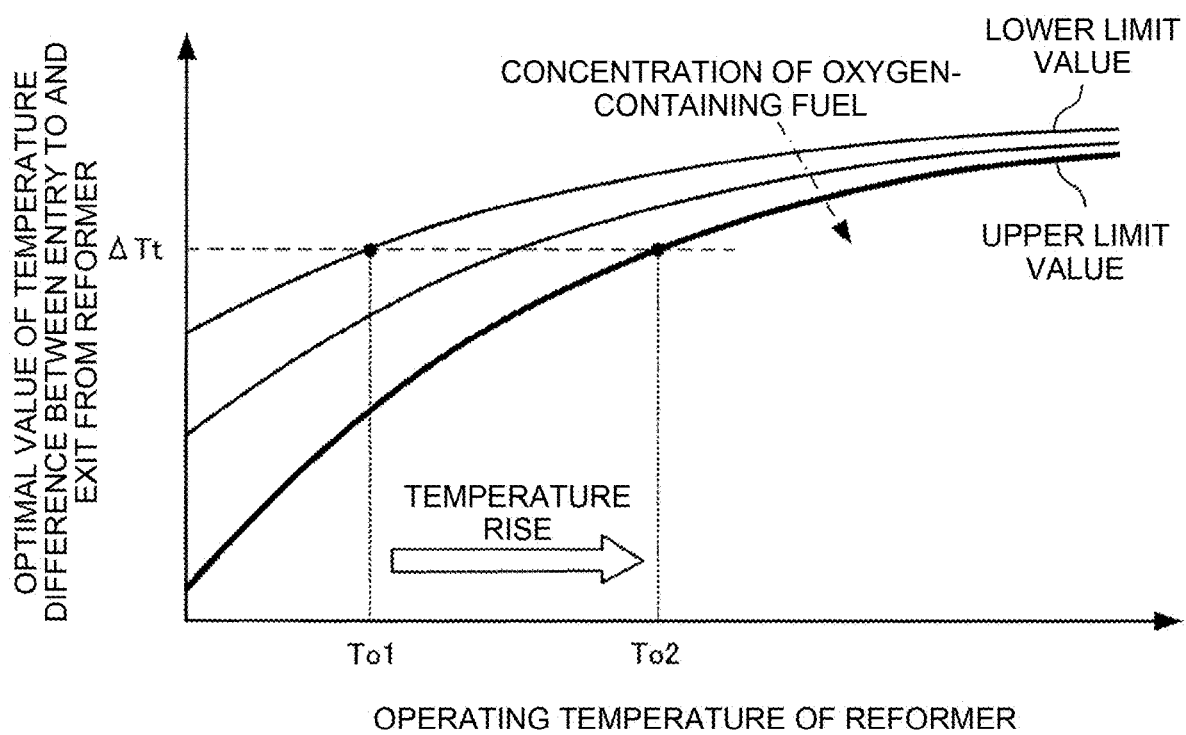
FIG. 5 is a conceptual view showing an example of a relation between operating temperature of the reformer and an optimal value of the temperature difference between the entry to and the exit from the reformer for each concentration of the oxygen-containing fuel contained in the gas flowing into the reformer.

FIG. 5 is a view describing another example of the heating control for the reformer 24.

FIG. 5 shows a relation between operating temperature of the reformer 24 and an optimal temperature difference between the entry to and the exit from the reformer 24 for each concentration of the oxygen-containing fuel in the mixed gas that flows into the reformer 24. The optimal temperature difference between the entry to and the exit from the reformer 24 represents an optimal value of the temperature difference between the entry to and the exit from the reformer 24.

In FIG. 5, in a case where the concentration of the oxygen-containing fuel in the mixed gas that flows into the reformer 24 is decreased to the lower limit value, the optimal temperature difference between the entry to and the exit from the reformer 24 at normal operating temperature To1 of the reformer 24 is set as a target temperature difference $\Delta Tt$.

Meanwhile, immediately after the aqueous solution is supplied into the fuel tank 21, the concentration of the oxygen-containing fuel in the mixed gas that flows into the reformer 24 becomes equal to an upper limit value. Target operating temperature To2 of the reformer 24 is set so that the optimal temperature difference between the entry to and the exit from the reformer 24 coincides with the target temperature difference $\Delta Tt$ at the upper limit value of the concentration of the oxygen-containing fuel.

Therefore, in step S20 shown in FIG. 2, when the temperature difference $\Delta T$ between the entry to and the exit from the reformer 24 becomes equal to or smaller than the operation change threshold value T1, the controller 50 may increase the operating temperature of the reformer 24 to the target operating temperature To2. In this case, for example, the entry temperature of the reformer 24, the exit temperature of the reformer 24, or an average value of the entry temperature and the exit temperature of the reformer 24 may be used as the operating temperature of the reformer 24.

As shown in FIG. 5, the target operating temperature To2 of the reformer 24 is obtained so that the optimal temperature difference between the entry to and the exit from the reformer 24 at the upper limit value of the concentration of the oxygen-containing fuel of the reformer 24 becomes the target temperature difference $\Delta Tt$. This means that the target operating temperature of the reformer 24 is obtained for each concentration of the oxygen-containing fuel based on the target temperature difference $\Delta Tt$ at the normal operating temperature To1 of the reformer 24.

Therefore, the controller 50 may change target operating temperature of the reformer 24 so that the temperature difference $\Delta T$ between the entry to and the exit from the reformer 24 at the normal operating temperature To1 of the reformer 24 becomes the target temperature difference $\Delta Tt$. In such a case, the controller 50 reduces the target operating temperature of the reformer 24 as an excessively high concentration of the oxygen-containing fuel in the gas flowing into the reformer 24 is reduced to the optimal value.

According to the first embodiment of the invention, the fuel cell system 100 supplies the fuel gas and the oxidant gas to a fuel cell that configures the fuel cell stack 10 so that the fuel cell stack 10 generates power. The fuel cell system 100 includes the fuel tank 21, the reformer 24, and the fuel pump 22. The fuel tank 21 stores the aqueous solution containing the oxygen-containing fuel. The reformer 24 reforms the mixed gas of steam and the oxygen-contained fuel gas, and generates the fuel gas, the mixed gas being obtained by vaporization of the aqueous solution. The fuel pump 22 configures the actuator that supplies the mixed gas to the reformer 24.

Further, the fuel cell system 100 includes the discharged gas combustor 41 and the discharged gas control valve 42 that configure the heating device that heats the reformer 24, and the detecting unit that estimates or detects a concentration of the oxygen-containing fuel in the mixed gas supplied to the reformer 24. This detecting unit includes, for example, at least one of the controller 50, the fuel concentration sensor 51, both of the entry temperature sensor 52 and the exit temperature sensor 53, and the FC output sensor 54. Further, the fuel cell system 100 includes the controller 50 that controls operations of the fuel pump 22 and the discharged gas control valve 42 so that the fuel cell stack 10 generates power.

Then, when the concentration of the oxygen-containing fuel in the mixed gas that is supplied to the reformer 24 is high, compared to when the concentration is low, the controller 50 increase a thermal dose (an amount of heat) to the reformer 24 using the discharged gas control valve 42. Alternatively, when the concentration of the oxygen-containing fuel in the mixed gas is high, compared to when the concentration is low, the controller 50 reduces a supply amount of the mixed gas to the reformer 24 using the fuel pump 22.

This means that, when the concentration of the oxygen-containing fuel in the reformer 24 is high, compared to when the concentration is low, the controller 50 increases the operation amount of the discharged gas control valve 42 that represents the opening degree of the discharged gas control valve 42, or decreases the operation amount of the fuel pump 22 that represents rotation speed of the fuel pump 22.

In the fuel cell system 100, the concentration of the oxygen-containing fuel in the aqueous solution stored in the fuel tank 21 is reduced over time due to, for example, a difference in volatility between the oxygen-containing fuel and water. Because the concentration of the oxygen-containing fuel in the mixed gas supplied to the reformer 24 is reduced accordingly, there is a concern that the gas composition in the reformer 24 is deteriorated and a supply amount of the fuel gas to the fuel cell stack 10 becomes insufficient.

To resolve this issue, according to this embodiment, when the concentration of the oxygen-containing fuel in the mixed gas is high, compared to when the concentration is low, the controller 50 reduces the operation amount of the fuel pump 22 or increases the operation amount of the discharged gas control valve 42. Thus, it is possible to restrain deterioration of the gas composition in the reformer 24.

For example, in a case where aqueous solution with a concentration of the oxygen-containing fuel higher than the optimal value is supplied to the fuel tank 21 in consideration of the volatility of the oxygen-containing fuel in the aqueous solution, the concentration of the oxygen-containing fuel in the mixed gas specified based on the concentration parameter becomes higher than the optimal value immediately after the aqueous solution is supplied. In such a case, the controller 50 controls the fuel pump 22 so as to reduce a supply amount of the mixed gas to the reformer 24. This restrains the oxygen-containing fuel from being oversupplied to the reformer 24, and the gas composition in the reformer 24 is thus improved. Thus, it is possible to avoid an insufficient supply of the fuel gas to the fuel cell stack 10.

Alternatively, in a case where the concentration of the oxygen-containing fuel in the fuel tank 21 is reduced over time and falls blow the optimal value, the controller 50 controls the fuel pump 22 so as to increase a supply amount of the mixed gas to the reformer 24. Thus, it is possible to avoid an insufficient supply of the fuel gas to the fuel cell stack 10.

As described above, when the concentration of the oxygen-containing fuel in the fuel tank 21 changes, it is possible to change the operating state of the reformer 24. Therefore, it is possible to avoid deterioration of the fuel cell caused by an insufficient supply of the fuel gas to the fuel cell stack 10. This means that it is possible to restrain degradation of power generation performance of the fuel cell stack 10.

Therefore, it is possible to provide the fuel cell system 100 that is able to store a mixture of the oxygen-containing fuel and water in the single fuel tank 21. This means that it is not necessary to separately provide a water storage tank in which pure water is stored, and a fuel tank in which the oxygen-containing fuel is stored, thus making it possible to have a simple configuration of the fuel cell system 100 that reforms the mixed gas.

Further, according to this embodiment, the entry temperature sensor 52 of the reformer 24 detects supply temperature of the mixed gas supplied to the reformer 24, and the exit temperature sensor 53 detects discharge temperature of the fuel gas discharged from the reformer 24 as the concentration parameters correlated with the concentration of the oxygen-containing fuel.

Then, as shown in FIG. 4, the controller 50 calculates the temperature difference ΔT between the entry temperature of the reformer 24 corresponding to the foregoing supply temperature of the mixed gas, and the exit temperature of the reformer 24 corresponding to the foregoing discharge temperature of the fuel gas. When the calculated temperature difference ΔT between the entry to and the exit from the reformer 24 is small, compared to when the temperature difference ΔT is large, the controller 50 reduces the operation amount of the fuel pump 22 or increases the operation amount of the discharged gas control valve 42.

For example, as described with reference to FIG. 2, when the concentration of the oxygen-containing fuel in the mixed gas flowing into the reformer 24 is too high, the gas composition in the reformer 24 is deteriorated, and chemical reactions for the endothermic reaction are inhibited. Thus, the temperature difference ΔT between the entry to and the exit from the reformer 24 becomes small. As described above, the temperature difference ΔT between the entry to and the exit from the reformer 24 has a correlation with the concentration of the oxygen-containing fuel in the mixed gas that flows into the reformer 24.

Therefore, the controller 50 according to this embodiment uses the foregoing correlation so as to restrain degradation of the reforming performance of the reformer 24. Specifically, as described in step S30 in FIG. 3, the controller 50 increases the opening degree of the discharged gas control valve 42 when the temperature difference ΔT between the entry to and the exit from the reformer 24 is equal to or smaller than the operation change threshold value T1.

As described above, with use of the temperature difference ΔT between the entry to and the exit from the reformer 24, the entry temperature sensor 52 and the exit temperature sensor 53 that are already provided in the reformer 24 can be diverted. Then, when the temperature difference ΔT between the entry to and the exit from the reformer 24 is equal to or smaller than the operation change threshold value T1, the controller 50 determines that the concentration of the oxygen-containing fuel of the mixed gas is high, and increases operating temperature of the reformer 24. Thus, the reforming performance of the reformer 24 is improved, thereby restraining a reduction of the supply amount of the fuel gas to the fuel cell stack 10.

Therefore, without newly providing the fuel concentration sensor 51 in the fuel tank 21, it is possible to restrain degradation of the reforming performance of the reformer 24 along with a reduction of the concentration of the oxygen-containing fuel in the aqueous solution. This means that it is possible to provide the fuel cell system 100 in a simple configuration.

The controller 50 according to this embodiment estimates whether or not the gas composition in the reformer 24 is deteriorated based on the temperature difference ΔT between the entry to and the exit from the reformer 24 without estimating the concentration of the oxygen-containing fuel in the mixed gas that flows into the reformer 24. However, the controller 50 may estimate the concentration of the oxygen-containing fuel in the mixed gas based on the temperature difference ΔT between the entry to and the exit from the reformer 24.

In this case, a temperature map showing a relation between the temperature difference between the entry to and the exit from the reformer 24 and the concentration of the oxygen-containing fuel in the mixed gas is stored in the controller 50 in advance, and the controller 50 refers to the temperature map once the controller 50 calculates the temperature difference ΔT between the entry to and the exit from the reformer 24. Then, the controller 50 estimates the concentration of the oxygen-containing fuel related to the calculated temperature difference ΔT between the entry to and the exit from the reformer 24.

Because of this, as shown in FIG. 2, it becomes possible to change the operating temperature of the reformer 24 for each estimate value of the concentration of the oxygen-containing fuel in the reformer 24, and an excessive temperature increase of the reformer 24 is restrained. Therefore, it is possible to restrain a consumption of the fuel gas in the discharged gas combustor 41.

Further, the controller 50 according to this embodiment may prioritize the heating control by which a thermal dose from the discharged gas control valve 42 to the reformer 24 is increased, over the reduction control by which a supply amount of the mixed gas from the fuel pump 22 to the reformer 24 is reduced. For example, when the temperature difference ΔT between the entry to and the exit from the reformer 24 is equal to or smaller than the operation change threshold value T1, the controller 50 first controls the discharged gas control valve 42 so as to heat the reformer 24. Thereafter, when the temperature difference ΔT between the entry to and the exit from the reformer 24 remains equal to or smaller than the operation change threshold value T1 even after an elapse of a given period of time, or when a rate of temperature rise of the reformer 24 is smaller than a given value, the controller 50 controls the fuel pump 22 and reduces a supply amount of the mixed gas to the reformer 24. As described above, the reduction control is executed when the reformer 24 is not heated sufficiently due to a response delay of the heating control. Thus, it is possible to swiftly make a compensation for an improvement of the reforming performance of the reformer 24. Therefore, degradation of the reforming performance of the reformer 24 can be improved in an early stage.

Second Embodiment

Figure 6:
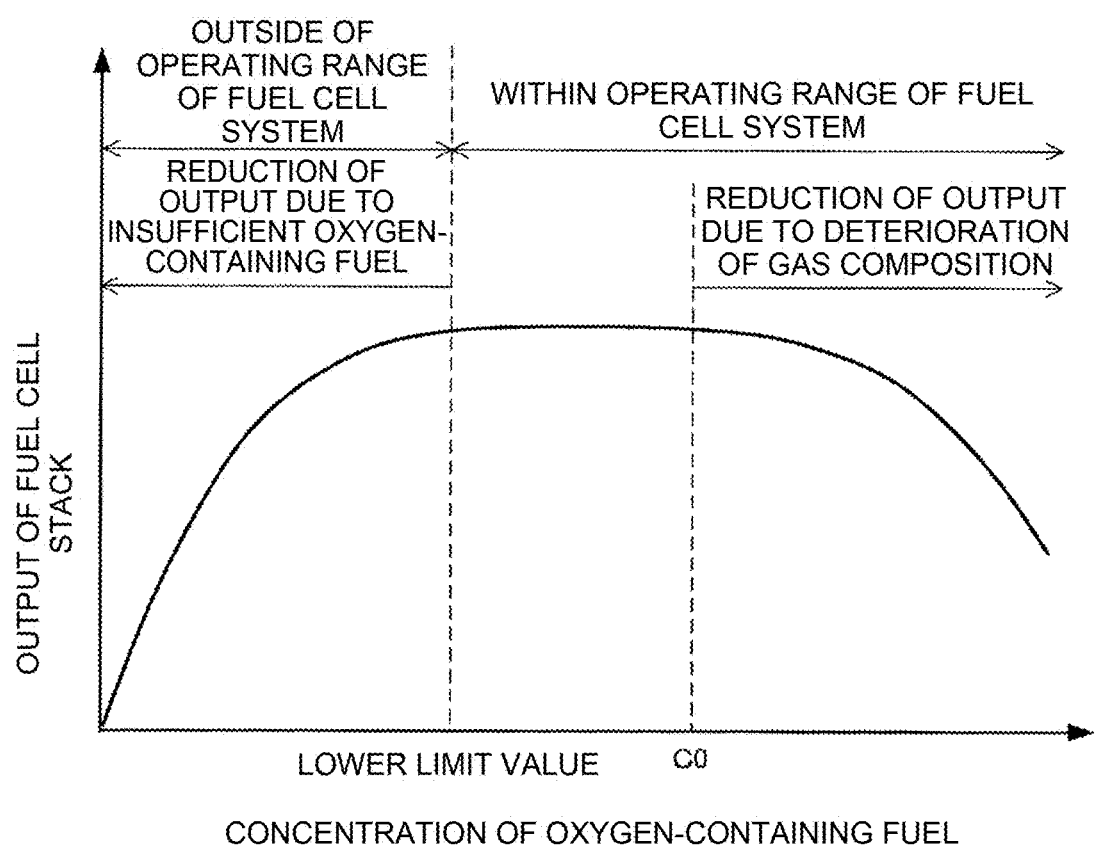
FIG. 6 is a conceptual view showing an example of a relation between the concentration of the oxygen-containing fuel contained in the gas flowing into the reformer, and an output of the fuel cell stack.

FIG. 6 is a conceptual view showing a relation between a concentration of oxygen-containing fuel in gas flowing into a reformer 24, and an output of a fuel cell stack 10.

As shown in FIG. 6, as the concentration of the oxygen-containing fuel becomes higher than a specific value C0, power output from the fuel cell stack 10, specifically a current, is reduced. This happens because, when the concentration of the oxygen-containing fuel becomes higher than the specific value C0, a gas composition in the reformer 24 is deteriorated, and a generation amount of fuel gas is reduced, so that a supply flow rate of the fuel gas from the reformer 24 to the fuel cell stack 10 becomes insufficient.

As described above, the output of the fuel cell stack 10 is correlated with the concentration of the oxygen-containing fuel in the reformer 24. Therefore, when a detection value or an estimate value of an output of the fuel cell stack 10 is reduced and falls below a target output of the fuel cell stack 10, it is possible to estimate that the concentration of the oxygen-containing fuel in the mixed gas flowing into the reformer 24 is high.

Figure 7:
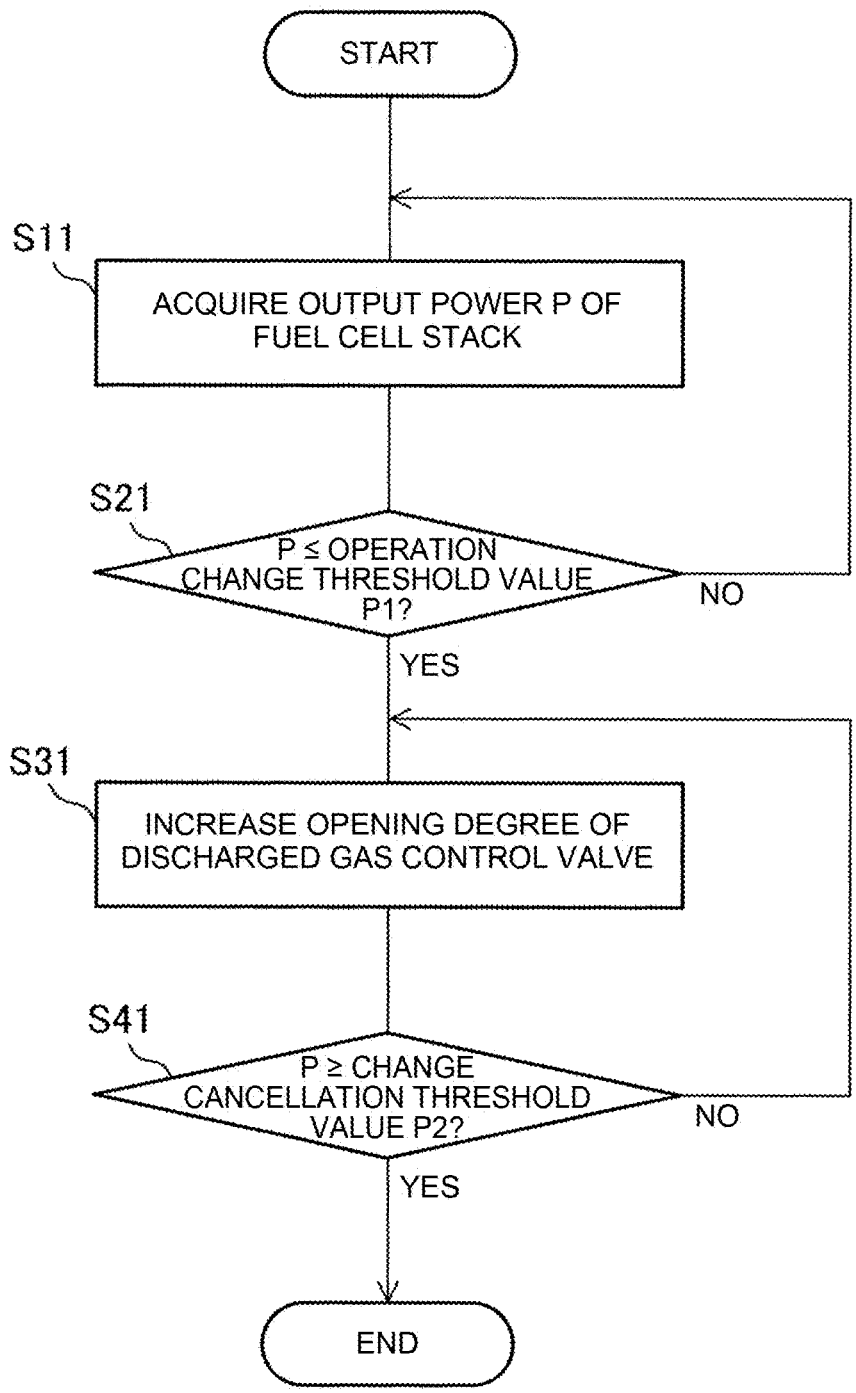
FIG. 7 is a flowchart showing an example of an operation control method for a reformer based on an output of a fuel cell stack according to a second embodiment of the invention.

FIG. 7 is a flowchart showing an example of processing steps regarding an operation control method for the reformer 24 according to the second embodiment of the invention.

In Step S11, a controller 50 acquires a detection value from an FC output sensor 54. The detection value shows output power P of the fuel cell stack 10.

In step S21, the controller 50 determines whether or not the output power P of the fuel cell stack 10 is equal to or smaller than an operation change threshold value P1 of the reformer 24. Then, when the output power P of the fuel cell stack 10 exceeds the operation change threshold value P1, the controller 50 determines that the concentration of the oxygen-containing fuel in the mixed gas flowing into the reformer 24 is not high, and returns to the processing of the step S11.

Similarly to the operation change threshold value T1 described in the step S20 in FIG. 3, the foregoing operation change threshold value P1 is set to output power of the fuel cell stack 10 by which a supply flow rate of the fuel gas from the reformer 24 to the fuel cell stack 10 does not fall below a lower limit value of a required flow rate.

For example, the operation change threshold value P1 is determined based on a value of output power of the fuel cell stack 10 corresponding to the specific value C0 shown in FIG. 6. In this embodiment, the operation change threshold value P1 is set to a power value that is 10% of a rated output of the fuel cell stack 10.

In step S31, when the output power P of the fuel cell stack 10 is equal to or smaller than the operation change threshold value P1, the controller 50 determines that a concentration of the oxygen-containing fuel in the mixed gas flowing into the reformer 24 is high. Then, the controller 50 executes heating control for the reformer 24 as described in the step S30 in FIG. 3.

In step S41, after an elapse of a predetermined period of time, the controller 50 newly obtains the output power P of the fuel cell stack 10, and determines whether or not the output power P is equal to or larger than a change cancellation threshold value P2 of the reformer 24.

Similarly to the change cancellation threshold value T2 described in the step S40 in FIG. 3, the change cancellation threshold value P2 described above is set to output power of the fuel cell stack 10 by which the reforming performance of the reformer 24 is maintained sufficiently. For example, the change cancellation threshold value P2 is set to, for example, a value larger than a value of output power of the fuel cell stack 10 corresponding to the specific value C0 shown in FIG. 6.

Then, when the output power P of the fuel cell stack 10 falls below the change cancellation threshold value P2, the controller 50 returns to the processing of the step S31 and increases an opening degree of a discharged gas control valve 42 by a predetermined step width.

Meanwhile, when the output power P of the fuel cell stack 10 is equal to or larger than the change cancellation threshold value P2, the controller 50 determines that the gas composition in the reformer 24 has improved, and ends the series of processing steps related to the operation control method for the reformer 24. With this operation control method for the reformer 24 according to this embodiment, the processing of the step S40 shown in FIG. 3 may be executed instead of the processing of the step S41.

According to the second embodiment of the invention, the FC output sensor 54 shown in FIG. 1 detects the output power P of the fuel cell stack 10 as a concentration parameter that is correlated with a concentration of the oxygen-containing fuel in the mixed gas. As shown in FIG. 6, as the concentration of the oxygen-containing fuel in the mixed gas flowing into the reformer 24 becomes high with respect to the specific value C0, the gas composition in the reformer 24 is deteriorated, and output power of the fuel cell stack 10 is thus reduced. This shows that an output of the fuel cell stack 10 is correlated with the concentration of the oxygen-containing fuel.

Then, as shown in the steps S31 and S41 in FIG. 7, the controller 50 increases an operation amount of the discharged gas control valve 42 that represents an opening degree of the discharged gas control valve 42 so that the output power P of the fuel cell stack 10 becomes the change cancellation threshold value P2 that is a predetermined value. This means that the controller 50 changes the operation amount that is the opening degree of the discharged gas control valve 42 from a value at the time of a normal operation in accordance with the output of the fuel cell stack 10.

Therefore, by using the foregoing correlation, the controller 50 according to this embodiment changes an operating state of the reformer 24 with use of the output power P of the fuel cell stack 10. As described above, it is possible to change the operating state of the reformer 24 as the FC output sensor 54 that is usually provided in the fuel cell stack 10 is diverted.

Hence, without providing the fuel concentration sensor 51 in the fuel tank 21, it is possible to restrain degradation of reforming performance of the reformer 24 due to a reduction of the concentration of the oxygen-containing fuel in the aqueous solution. This means that it is possible to provide the fuel cell system 100 with a simple configuration.

In this embodiment, the controller 50 estimates deterioration of the gas composition in the reformer 24 based on the output power P of the fuel cell stack 10 without estimating the concentration of the oxygen-containing fuel in the mixed gas that flows into the reformer 24. However, the controller 50 may estimate the concentration of the oxygen-containing fuel in the mixed gas based on the output power P of the fuel cell stack 10.

In this case, as shown in FIG. 6, an output map showing a relation between the output power of the fuel cell stack 10 and the concentration of the oxygen-containing fuel in the mixed gas is stored in the controller 50 in advance. Once the controller 50 acquires the output power P of the fuel cell stack 10, the controller 50 refers to the output map and estimates the concentration of the oxygen-containing fuel related to the acquired output power P.

Thus, as shown in FIG. 2, it is possible to change operating temperature of the reformer 24 for each estimate value of the concentration of the oxygen-containing fuel in the reformer 24. Thus, it is possible to restrain an excessive increase in temperature of the reformer 24.

Further, in this embodiment, the output power P of the fuel cell stack 10 is used as the concentration parameter by which the concentration of the oxygen-containing fuel in the mixed gas is specified. However, the detection value of the fuel concentration sensor 51 shown in FIG. 1 may be used.

Third Embodiment

Figure 8:
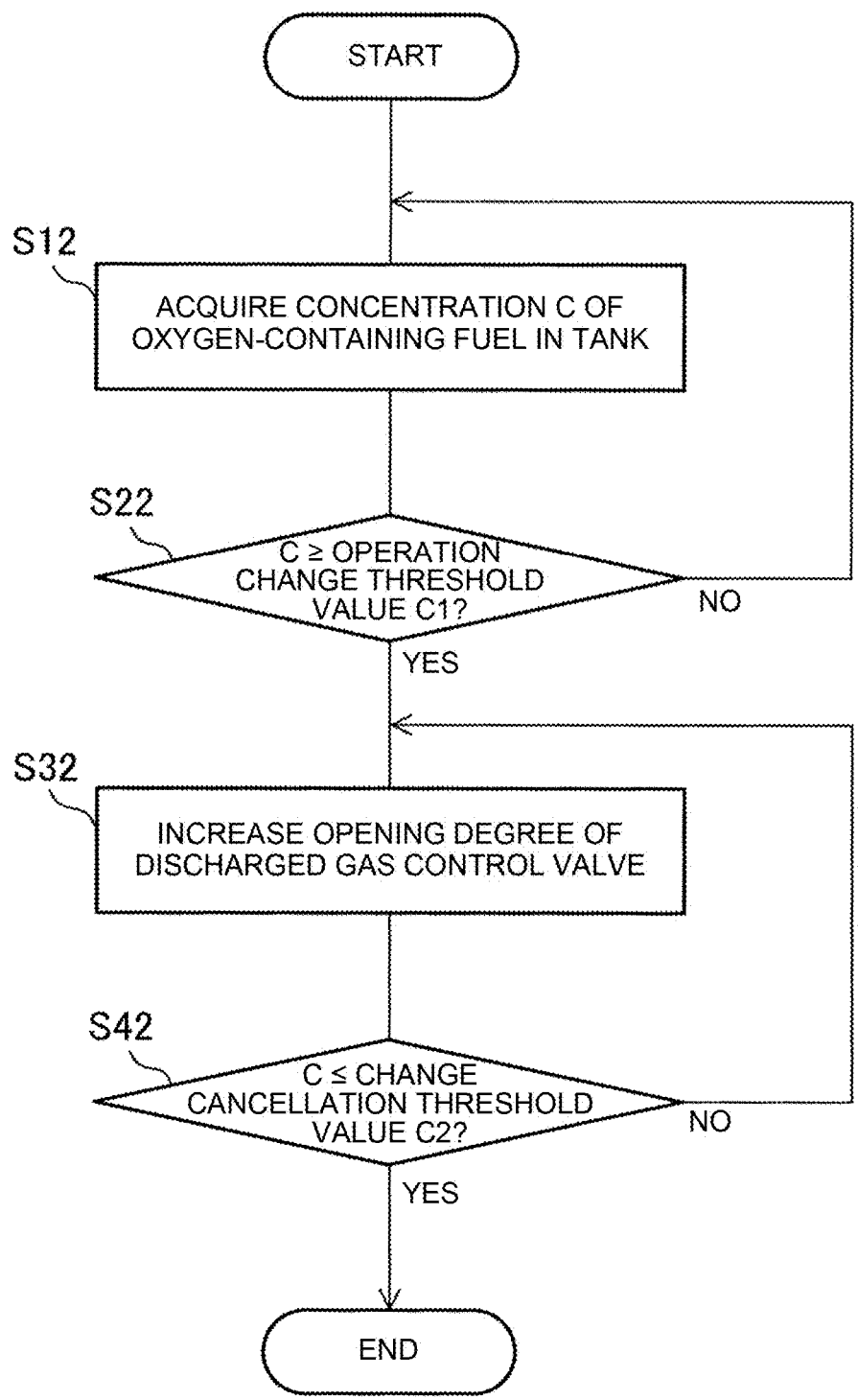
FIG. 8 is a flowchart showing an example of an operation control method of a reformer based on a concentration of oxygen-containing fuel in a fuel tank according to a third embodiment of the invention.

FIG. 8 is a flowchart showing an example of processing steps related to an operation control method for a reformer 24 according to a third embodiment of the invention.

In step S12, a controller 50 acquires a detection value from a fuel concentration sensor 51. The detection value represents a concentration C of oxygen-containing fuel in aqueous solution in a fuel tank 21.

In step S22, the controller 50 determines whether or not the concentration C of the oxygen-containing fuel in the aqueous solution in the fuel tank 21 is equal to or larger than an operation change threshold value C1 of the reformer 24. Then, when the concentration C of the oxygen-containing fuel falls below the operation change threshold value C1, the controller 50 determines that the concentration of the oxygen-containing fuel in the mixed gas flowing into the reformer 24 is not high, and returns to the processing of the step S12.

Similarly to the operation change threshold value T1 described in the step S20 in FIG. 3, the operation change threshold value C1 is set to a concentration of the oxygen-containing fuel in the fuel tank 21 by which a supply flow rate of fuel gas from the reformer 24 to the fuel cell stack 10 does not fall below a lower limit value of a required flow rate. For example, the operation change threshold value C1 is set to 50% vol.

When the concentration C of the oxygen-containing fuel is equal to or larger than the operation change threshold value C1, the controller 50, in step S32, determines that the concentration of the oxygen-containing fuel in the mixed gas flowing into the reformer 24 is high. Then, as described in the step S30 in FIG. 3, the controller 50 executes heating control for the reformer 24.

In step S42, after an elapse of a predetermined period of time, the controller 50 newly acquires the concentration C of the oxygen-containing fuel, and determines whether or not the concentration C is equal to or less than a change cancellation threshold value C2 of the reformer 24.

Similarly to the change cancellation threshold value T2 described in the step S40 in FIG. 3, the foregoing change cancellation threshold value C2 is set to a concentration of the oxygen-containing fuel in the fuel tank 21 by which the reforming performance of the reformer 24 is maintained sufficiently.

Then, when the concentration C of the oxygen-containing fuel exceeds the change cancellation threshold value C2, the controller 50 returns to the processing of the step S32, and increases an opening degree of a discharged gas control valve 42 by a predetermined step width.

Meanwhile, when the concentration C of the oxygen-containing fuel is equal to or less than the change cancellation threshold value C2, the controller 50 determines that the gas composition in the reformer 24 is not deteriorated, and ends the series of processing steps related to the operation control method for the reformer 24. With the operation control method for the reformer 24 according to this embodiment, the processing of the step S40 shown in FIG. 3 or the processing of the step S41 shown in FIG. 7 may be executed instead of the processing of the step S42.

According to the third embodiment of the invention, the fuel concentration sensor 51 is provided in the fuel tank 21, and detects a concentration of the oxygen-containing fuel contained in the aqueous solution as the concentration parameter. With regard to the detection value of the concentration of the oxygen-containing fuel in the fuel tank 21, an error is smaller compared to an estimate value based on the temperature difference ΔT between the entry to and the exit from the reformer 24 or an estimate value based on output power P of the fuel cell stack 10.

Therefore, with use of the detection value of the fuel concentration sensor 51, the controller 50 is able to heat the reformer 24 or reduce the mixed gas to the reformer 24 precisely. Therefore, it is possible avoid an insufficient supply of the fuel gas to the fuel cell stack 10 more reliably.

Fourth Embodiment

In the foregoing embodiment, as shown in FIG. 1, the reformer 24 is heated as the opening degree of the discharged gas control valve 42 is increased so as to increase a discharged gas supply amount to the reformer 24. However, the method for heating the reformer 24 is not limited to this. In a fourth embodiment of the invention, another method for heating the reformer 24 is described with reference to FIG. 9.

Figure 9:
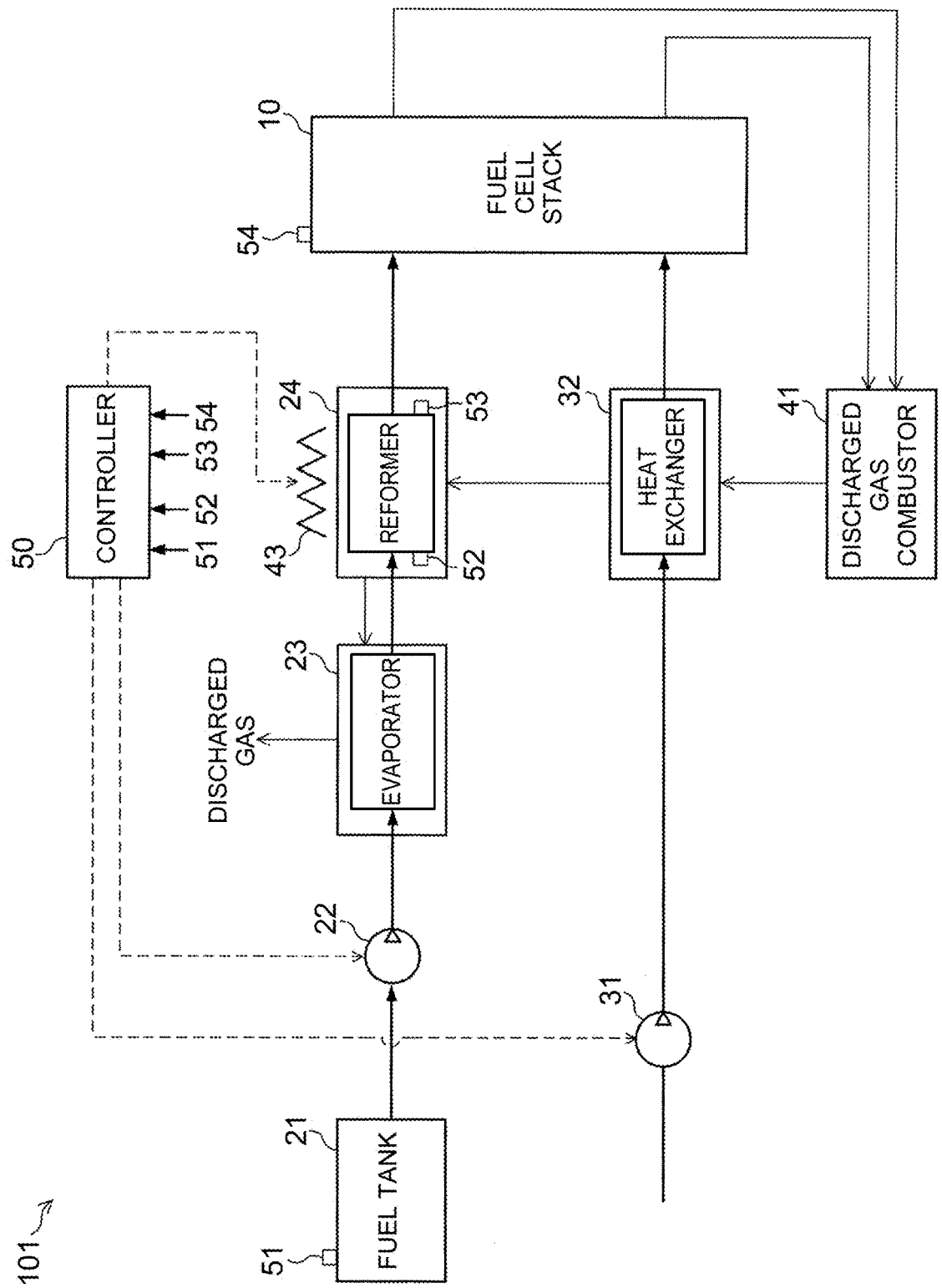
FIG. 9 is a view showing an example of a configuration of a fuel cell system according to a fourth embodiment of the invention.

FIG. 9 is a configuration view showing an example of a configuration of a fuel cell system 101 according the fourth embodiment of the invention.

The fuel cell system 101 includes a heater 43 instead of the discharged gas control valve 42 of the fuel cell system 100 shown in FIG. 1. The rest of the configuration is the same as that of the fuel cell system 100, and detailed description of the rest of the configuration is omitted.

The heater 43 configures a heating device that heats a reformer 24. The heater 43 is provided around the reformer 24 and supplies heat to the reformer 24. In other words, a calorific value of the heater 43 is controlled by a controller 50.

The controller 50 increases a calorific value of the heater 43 when a concentration of oxygen-containing fuel in mixed gas that flows into the reformer 24 is high.

The controller 50 according to this embodiment detects a concentration parameter related to a concentration of the oxygen-containing fuel, and determines whether or not the detected concentration parameter exceeds a given determination threshold value. The determination threshold value is a threshold value that is set in order to determine whether or not reforming performance of the reformer 24 is degraded. For example, when the detected concentration parameter exceeds the given determination threshold value, the controller 50 determines that the concentration of the oxygen-containing fuel in the mixed gas is high, and switches an operating state of the heater 43 from a stopped state (OFF) to a heating state (ON).

Figure 10:
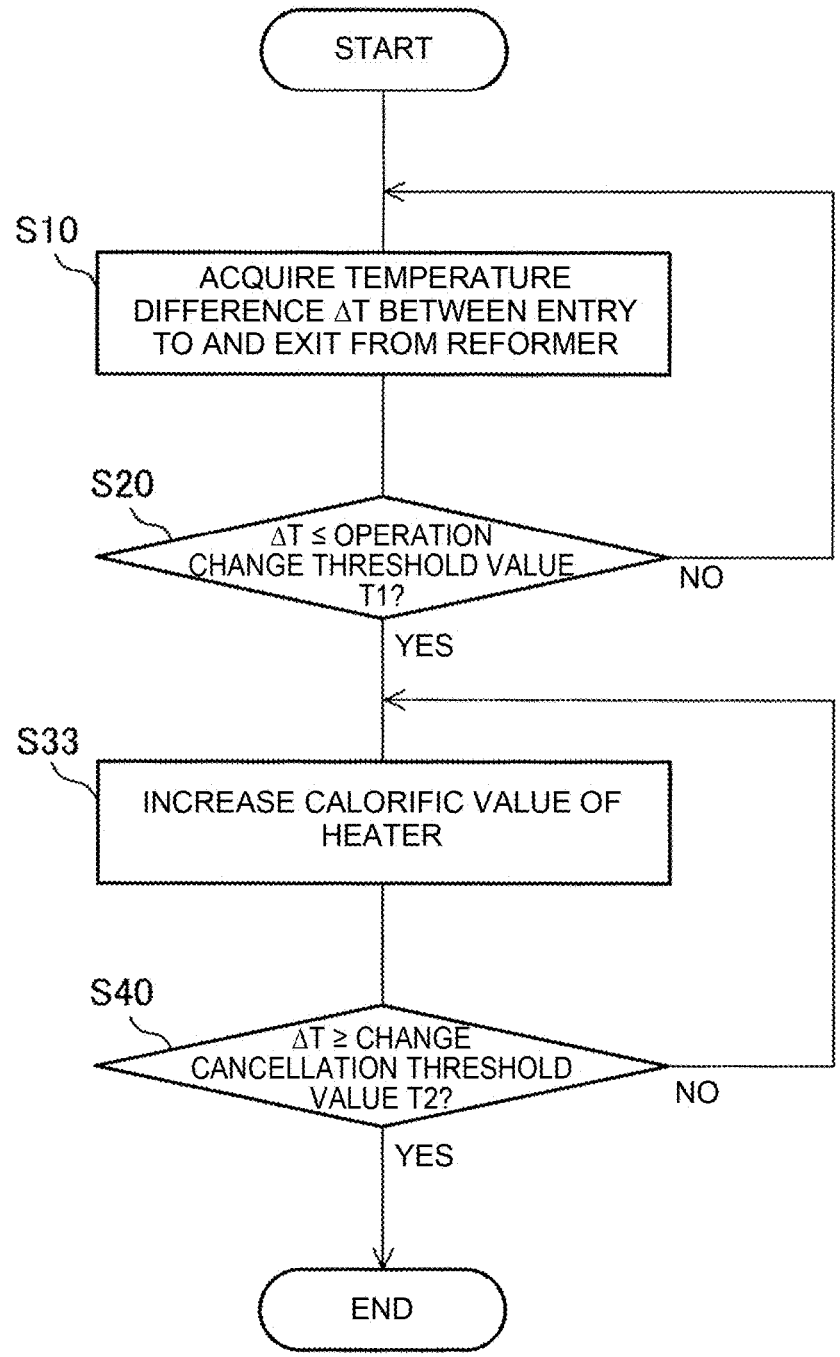
FIG. 10 is a flowchart showing an example of an operation control method for a reformer in which a heater is used according to the embodiment.

FIG. 10 is a flowchart showing an example of processing steps regarding an operation control method for the reformer 24 according to this embodiment.

With the operation control method according to this embodiment, the controller 50 executes the processing of the step S33 instead of the processing of the step S30 in the operation control method shown in FIG. 3. Since the rest of the steps are the same as the steps S10, S20, and S30 shown in FIG. 3, they are denoted by the same reference numerals, respectively, and the description thereof is omitted.

In the step S33, when the temperature difference ΔT between the entry to and the exit from the reformer 24 is equal to or less than the foregoing operation change threshold value T1, the controller 50 increases a calorific value of the heater 43. Since the reformer 24 is thus heated, it is possible to increase operating temperature of the reformer 24 so that an endothermic reaction in the reformer 24 is promoted.

For example, the controller 50 switches the operating state of the heater 43 from OFF to ON. Alternatively, the controller 50 may increase a calorific value of the heater 43 to a predetermined value.

Also, the controller 50 proceeds to the processing of step S40, and causes the heater 43 to heat the reformer 24 until the temperature difference ΔT between the entry to and the exit from the reformer 24 is equal to or larger than the change cancellation threshold value T2.

As described above, when the temperature difference ΔT between the entry to and the exit from the reformer 24 that is one of the concentration parameters regarding the concentration of the oxygen-containing fuel in the reformer 24 is less than the operation change threshold value T1, the controller 50 increases the operating temperature of the heater 43. This restrains deterioration of the gas composition in the reformer 24, and it is thus possible to avoid a situation where a supply amount of the fuel gas to the fuel cell stack 10 becomes insufficient.

Further, in the step S20 in FIG. 10, the temperature difference ΔT between the entry to and the exit from the reformer 24 is used as the concentration parameter. However, the concentration parameter is not limited to this. For example, as described in the step S21 in FIG. 7 and the step S22 in FIG. 8, the output power P of the fuel cell stack 10, the concentration C of the oxygen-containing fuel in the fuel tank 21, and so on, which are correlated with the concentration parameter, may be used.

Further, in this embodiment, the discharged gas from the discharged gas combustor 41 is supplied to the reformer 24, and heat generated in the heater 43 is also supplied to the reformer 24, thereby heating the reformer 24. However, the reformer 24 may be heated only by the heater 43.

According to the fourth embodiment of the invention, the fuel cell system 101 includes the heater 43 as the heating device in addition to a heating structure that supplies the discharged gas from the discharged gas combustor 41 to the reformer 24. Because of this, when the temperature difference ΔT between the entry to and the exit from the reformer 24 is equal to or less than the operation change threshold value T1, it is possible to ensure that the reformer 24 is heated regardless of a combustion status of the discharged gas combustor 41.

For example, when power generation by the fuel cell stack 10 is stopped during idle stop, there is a concern that the discharged gas is not supplied to the reformer 24 sufficiently from the discharged gas combustor 41. Since it is still possible to heat the reformer 24 in such a situation, it is possible to restrain an insufficient supply of the fuel gas to the fuel cell stack 10 when, for example, a vehicle is accelerated from idle stop.

Fifth Embodiment

In the foregoing embodiments, the heating control for the reformer 24 is carried out so as to restrain deterioration of the gas composition in the reformer 24 due to an excessive concentration of the oxygen-containing fuel. However, it is also possible to restrain deterioration of the gas composition by reducing a supply amount of the oxygen-contained fuel gas to the reformer 24.

A controller 50 according to a fifth embodiment of the invention reduces a supply flow rate of mixed gas that is supplied to a reformer 24 when a concentration parameter related to a concentration of oxygen-containing fuel in the reformer 24 exceeds a given determination threshold value. A fuel cell system according to this embodiment has the configuration of the fuel cell system 100 shown in FIG. 1.

Figure 11:
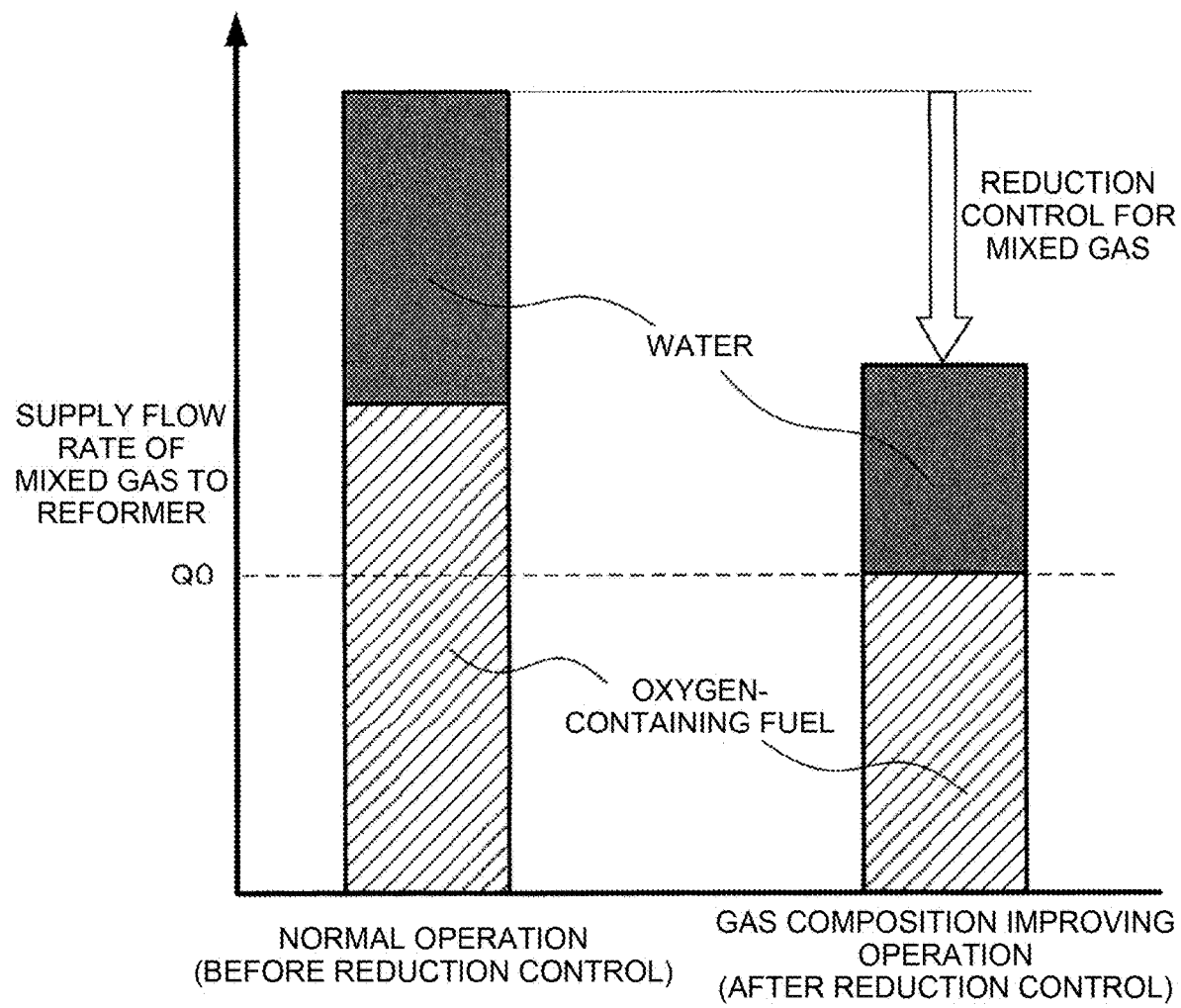
FIG. 11 is a view showing an example of an operation control method by which a gas supply amount to a reformer is changed according to a fifth embodiment of the invention.

FIG. 11 describes a control method for controlling the supply flow rate of the mixed gas to the reformer 24 in this embodiment.

As shown in FIG. 11, immediately after aqueous solution is supplied to a fuel tank 21, the concentration of the oxygen-containing fuel in the mixed gas that flows into the reformer 24 is high. Therefore, the supply amount of the oxygen-containing fuel in the mixed gas becomes excessively larger than a lower limit value Q0. As a result, a gas composition in the reformer 24 is deteriorated.

The lower limit value Q0 regarding the supply amount of the oxygen-containing fuel is calculated based on a target power generation amount that is required for power generation by the fuel cell stack 10. For example, the larger the target power generation amount of the fuel cell stack 10 becomes, the larger the lower limit value Q0 becomes.

The controller 50 changes an operation state of the reformer 24 from a normal operation to a gas composition improving operation in order to restrain deterioration of the gas composition in the reformer 24. During the gas composition improving operation, the controller 50 reduces the supply amount of the mixed gas so that the concentration of the oxygen-containing fuel in the mixed gas that flows into the reformer 24 does not fall below the lower limit value Q0.

The controller 50 according to this embodiment controls rotation speed of a fuel pump 22 shown in FIG. 1 so as to control the supply flow rate of the mixed gas from an evaporator 23 to the reformer 24. Thus, it is possible to restrain deterioration of the gas composition of the reformer 24.

Figure 12:
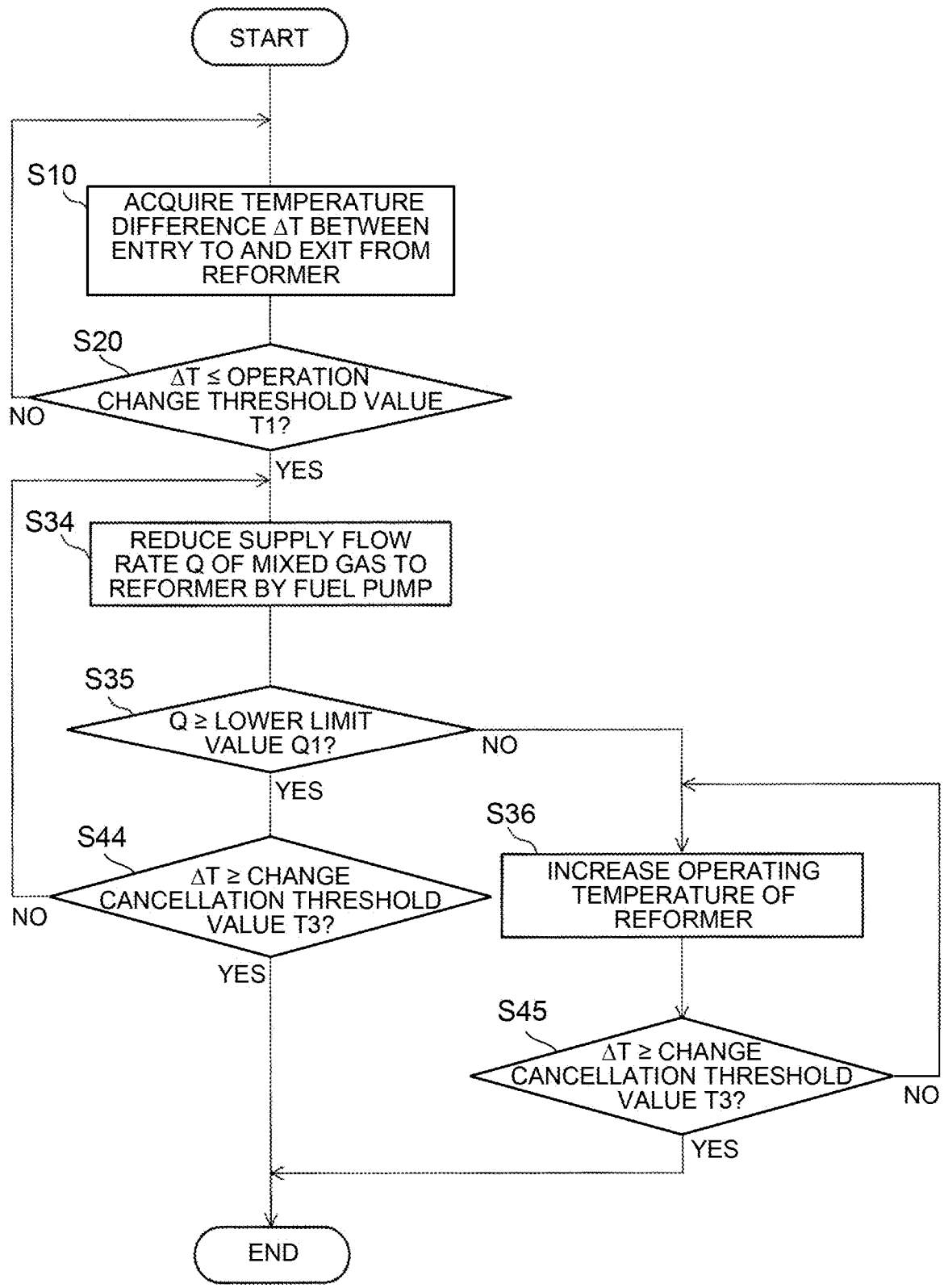
FIG. 12 is a flowchart showing an example of an operation control method by which a gas supply amount to the reformer is controlled according to the embodiment.

FIG. 12 is a flowchart showing an example of processing steps regarding an operation control method for the reformer 24 according to this embodiment.

In the operation control method according to this embodiment, the controller 50 executes processing of steps S34 to S36, and steps S44 and S45, instead of the processing of the steps S30 and S40 in the operation control method shown in FIG. 3. Since the rest of the processing is the same as the processing of the steps S10 and S20 shown in FIG. 3, it is denoted by the same reference numeral and the description thereof is omitted.

In the step S34, when a temperature difference ΔT between an entry to and an exit from the reformer 24 is equal to or less than an operation change threshold value T1, the controller 50 executes a reduction control for the mixed gas with respect to the reformer 24. For example, the controller 50 reduces rotation speed of the fuel pump 22 by a specific step width so that a supply flow rate Q of the mixed gas to the reformer 24 is reduced.

Because of this, the supply flow rate of the oxygen-containing fuel to the reformer 24 is reduced and it is thus possible to improve the gas composition in the reformer 24. Accordingly, a chemical reaction for an endothermic reaction that does not contribute to generation of the fuel gas in the reformer 24 is restrained, and the temperature difference ΔT between the entry to and the exit from the reformer 24 becomes small.

In the step S35, the controller 50 determines whether or not the supply flow rate Q of the mixed gas to the reformer 24 is equal to or larger than a lower limit value Q1. The lower limit value Q1 is set based on experimental data, simulation results, or the like, and is set in advance in consideration of the lower limit value Q0 of the supply flow rate of the oxygen-containing fuel shown in FIG. 11, for example.

In the step S44, after an elapse of a predetermined period of time, the controller 50 newly acquires the temperature difference ΔT between the entry to and the exit from the reformer 24, and determines whether or not the temperature difference ΔT between the entry to and the exit from the reformer 24 is equal to or larger than a change cancellation threshold value T3. The change cancellation threshold value T3 is set based on experimental data, simulation results, or the like, similarly to the change cancellation threshold value T2 described for the step S40 in FIG. 3.

Then, when the temperature difference ΔT between the entry to and the exit from the reformer 24 equal to or larger than the change cancellation threshold value T3, the controller 50 stops the reduction control for the mixed gas with respect to the reformer 24, and ends the operation control method for the reformer 24.

Meanwhile, when the temperature difference ΔT between the entry to and the exit from the reformer 24 is less than the change cancellation threshold value T3, the controller 50 returns to the processing of the step S34, and further reduces the rotation speed of the fuel pump 22 by a specific step width so that the supply flow rate Q of the mixed gas is reduced further.

When the supply flow rate Q of the mixed gas to the reformer 24 falls below the lower limit value Q1 in the step S35, the controller 50 increases the rotation speed of the fuel pump 22 so that the supply flow rate Q of the mixed gas increases to the lower limit value Q1, and proceeds to the processing of step S36.

In step S36, when the supply flow rate Q of the mixed gas reaches the lower limit value Q1, the controller 50 increases operating temperature of the reformer 24 by a predetermined step width. For example, the controller 50 executes the processing of the step S30 shown in FIG. 3. Alternatively, the heater 43 may be provided around the reformer 24, and then the processing of the step S33 shown in FIG. 10 may be executed. Thus, the operating temperature of the reformer 24 increases, and the gas composition in the reformer 24 is improved.

In the step S45, after an elapse of a predetermined period of time, the controller 50 newly acquires the temperature difference ΔT between the entry to and the exit from the reformer 24, and determines whether or not the temperature difference ΔT between the entry to and the exit from the reformer 24 is equal to or larger than the change cancellation threshold value T3.

Then, when the temperature difference ΔT between the entry to and the exit from the reformer 24 falls below the change cancellation threshold value T3, the controller 50 returns to the processing of the step S36, and increases the operating temperature of the reformer 24 by a predetermined step width.

Meanwhile, when the temperature difference ΔT between the entry to and the exit from the reformer 24 is equal to or larger than the change cancellation threshold value T2, the controller 50 determines that the gas composition of the reformer 24 has improved, stops the heating control for the reformer 24, and ends the series of the processing steps related to the operation control method for the reformer 24.

According to the fifth embodiment of the invention, as described in the step S34 in FIG. 12, the controller 50 reduces the rotation speed of the fuel pump 22 when the temperature difference ΔT between the entry to and the exit from the reformer 24, which is one of the concentration parameters, is equal to or less than the operation change threshold value T1. This means that, as shown in FIG. 11, the controller 50 reduces an operation amount of the fuel pump 22 so that a supply amount of the mixed gas to the reformer 24 is reduced in accordance with the concentration parameter.

Hence, it is possible to restrain deterioration of the gas composition in the reformer 24 without raising operating temperature of the reformer 24. Therefore, it is possible to avoid an insufficient supply of the fuel gas to the fuel cell stack 10 while reducing a fuel consumption of the fuel cell systems 100 and 101 caused by heating of the reformer 24.

The embodiments of the invention have been described so far. However, the foregoing embodiments only show a part of application examples of the invention, and are not intended to limit the technical scope of the invention to the specific configurations of the embodiments described above.

For example, a sensor that is able to detect a concentration of the oxygen-containing fuel in the mixed gas flowing into the reformer 24 may be provided in the reformer 24, and a detection value of the sensor may be used as the concentration parameter. Alternatively, the controller 50 may be provided with a map, and a counter that measures time. The map shows a relation between time elapsed after a supply of aqueous solution to the fuel tank 21 and a concentration of the oxygen-containing fuel in the aqueous solution. Then, after the aqueous solution is supplied to the fuel tank 21, the controller 50 may acquire a value of the counter as the concentration parameter. Thereafter, the controller 50 estimates a concentration of the oxygen-containing fuel associated with the value of the counter.

Further, in the foregoing embodiments, degradation of the reforming performance of the reformer 24 is determined with use of one of the concentration parameters, that are the temperature difference ΔT between the entry to and the exit from the reformer 24, the output power P of the fuel cell stack 10, and the concentration C of the oxygen-containing fuel in the fuel tank 21. However, an operating state of the reformer 24 may be changed when more than one concentration parameters exceed given determination threshold values, respectively.

Thus, in a situation where the reforming performance of the reformer 24 is degraded, it is possible to improve the reforming performance more reliably compared to the case where degradation of the reforming performance is determined by one concentration parameter. This means that it is possible to avoid execution of unnecessary control for changing the operating state of the reformer 24 when the reforming performance is not degraded.

Furthermore, in the foregoing embodiments, the evaporator 23 and the reformer 24 are provided separately from each other. However, the evaporator 23 and the reformer 24 may be configured integrally. In this case, it is also possible to obtain the effects of this embodiment.

The foregoing embodiments may be combined with each other as appropriate.

The invention claimed is:

1. A fuel cell system in which a fuel gas and an oxidant gas are supplied to a fuel cell so that the fuel cell generates power, the fuel cell system comprising:
   a tank that stores aqueous solution containing oxygen-containing fuel;
   a reformer that reforms a mixed gas obtained as the aqueous solution is vaporized, the reformer thus generating the fuel gas;
   an actuator that supplies the mixed gas to the reformer;
   a heating device that heats the reformer;
   a detecting unit that estimates or detects a concentration of the oxygen-containing fuel contained in the mixed gas that is supplied to the reformer; and
   a controller programmed to control operations of the actuator and the heating device so that the fuel cell generates power, wherein the controller is programmed to increase a thermal dose to the reformer from the heating device or reduce a supply amount of the mixed gas to the reformer by the actuator, as the concentration of the oxygen-containing fuel exceeds a given determination threshold value.

2. The fuel cell system according to claim 1,
wherein the controller is further programmed to perform heating control for increasing the thermal dose from the heating device to the reformer prior to reducing the supply amount of the mixed gas to the reformer, when the concentration of the oxygen-containing fuel exceeds the given determination threshold value.

3. The fuel cell system according to claim 1,
wherein the detecting unit detects, as the concentration of the oxygen-containing fuel, a temperature of the mixed gas supplied to the reformer and a temperature of the fuel gas discharged from the reformer; and
the controller is further programmed to reduce the supply amount of the mixed gas to the reformer when a temperature difference between the temperature of the mixed gas and the temperature of the fuel gas is equal to or less than a value corresponding to the given determination threshold value.

4. The fuel cell system according to claim 1,
wherein the detecting unit detects an output of the fuel cell as the concentration of the oxygen-containing fuel, and
the controller increases the thermal dose to the reformer or reduces the supply amount of the mixed gas to the reformer such that the output of the fuel cell becomes a predetermined value.

5. The fuel cell system according to claim 1,
wherein the detecting unit is provided in the tank, and detects a concentration of the oxygen-containing fuel in the aqueous solution.

6. The fuel cell system according to claim 1,
wherein the detecting unit estimates the concentration of the oxygen-containing fuel based on a temperature difference between a temperature of the mixed gas and a temperature of the fuel gas.

7. The fuel cell system according to claim 1,
wherein the detecting unit estimates the concentration of the oxygen-containing fuel based on an output of the fuel cell.

8. A control method for a fuel cell system that includes a reformer that reforms a mixed gas of oxygen-containing fuel gas and steam, an actuator that supplies the mixed gas to the reformer, and a heating device that heats the reformer, the control method comprising:
a power generation controlling step of controlling power generation of a fuel cell by supplying fuel gas to the fuel cell, the fuel gas being reformed by the reformer; and
a reform controlling step of increasing an operation amount of the heating device or reducing an operation amount of the actuator, as a concentration of oxygen-containing fuel contained in the mixed gas supplied to the reformer exceeds a given determination threshold value.

* * * * *